Oct. 13, 1936.　　　　I. SHORT　　　　2,057,270
REDUCTION GEARING
Filed June 20, 1934　　　5 Sheets-Sheet 1

WITNESSES:
James K. Mosser
E. Lutz

INVENTOR
IRA SHORT
BY A. B. Reavis
ATTORNEY

Oct. 13, 1936.   I. SHORT   2,057,270
REDUCTION GEARING
Filed June 20, 1934   5 Sheets-Sheet 3

WITNESSES:
James K. Mosser
E. Lutz

INVENTOR
IRA SHORT.
BY a. B. Ruvis
ATTORNEY

Oct. 13, 1936.   I. SHORT   2,057,270
REDUCTION GEARING
Filed June 20, 1934   5 Sheets-Sheet 4

WITNESSES:
James K. Mosser
E. Lutz

INVENTOR
IRA SHORT
BY A. B. Renoir
ATTORNEY

Oct. 13, 1936.  I. SHORT  2,057,270
REDUCTION GEARING
Filed June 20, 1934  5 Sheets-Sheet 5

WITNESSES:
James K. Mosser
E. Lutz

INVENTOR
IRA SHORT.
BY a. B. Reavis
ATTORNEY

Patented Oct. 13, 1936

2,057,270

UNITED STATES PATENT OFFICE 2,057,270

REDUCTION GEARING

Ira Short, Prospect Park, Pa., assignor to Westinghouse Electric & Manufacturing Company, East Pittsburgh, Pa., a corporation of Pennsylvania Application June 20, 1934, Serial No. 731,417

4 Claims. (Cl. 74—606)

My invention relates to reduction gearing, more particularly of the marine propulsion type, and it has for an object to provide improved means of support for the driving pinion or pinions.

With reduction gearing, it is not only necessary to support the gear members so that the proper meshing relation will be provided and maintained but also the structure must have adequate torsional resistance to distortion or displacement under influence of the load transmitted. Where the driving pinion has an intermediate bearing, the supporting structure must be constructed and arranged to afford resistance to the heavy loading imposed on such bearing. In accordance with my invention, the pinion or pinions are supported by arch girders, whereby a relatively strong and light structure may be provided to hold the pinions in proper meshing relation with respect to the gear, and the arch girders are stiffened against relative or torsional displacement by suitable connecting stress structure. Preferably, the arch girders constitute a substantial portion of the upper, or cover, part of the gear casing attached to the lower part of such casing. The lower part of the gear casing is provided with radial bearings carrying the spindle for the driven gear and it may also be provided with a thrust bearing for transmitting propeller thrust from the spindle to the ship's structure. The arches are preferably of the fabricated box type and they are constructed and arranged to provide end and intermediate bearings for each pinion; and the arches are connected together so as to provide a torsionally stiff structure. The torsionally stiff supporting cover structure has spaces thereof, such as between arches and at the ends, filled with suitable plate material. Accordingly, it is a further object of my invention to provide a reduction gear casing having the aforementioned advantageous features of construction resulting in an efficient distribution of material for the loads transmitted and also providing a design which may be readily fabricated.

These and other objects are effected by my invention as will be apparent from the following description and claims taken in accordance with the accompanying drawings, forming a part of this application, in which:

Figure 1:
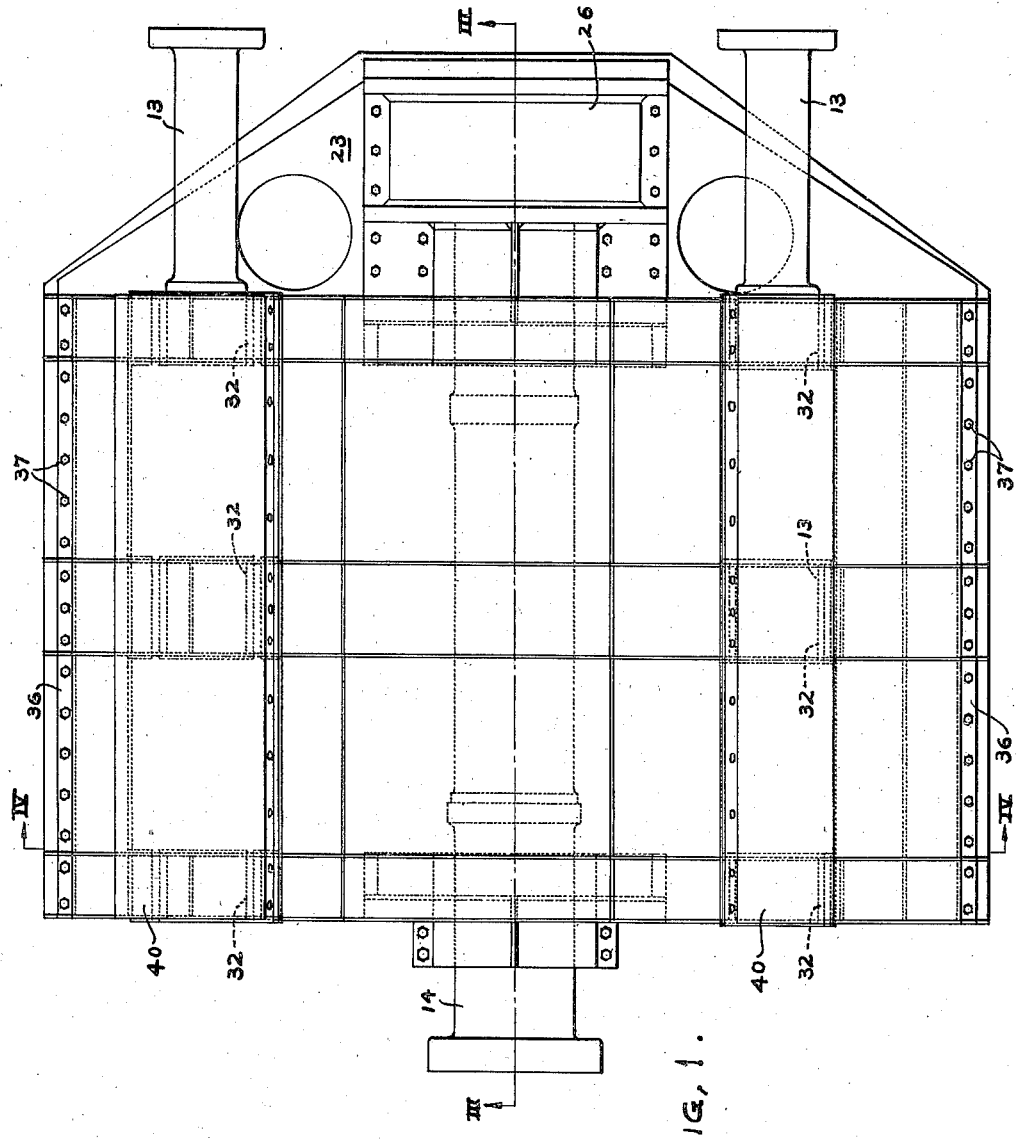
Fig. 1 is a plan view of my improved reduction gear.
Figure 2:
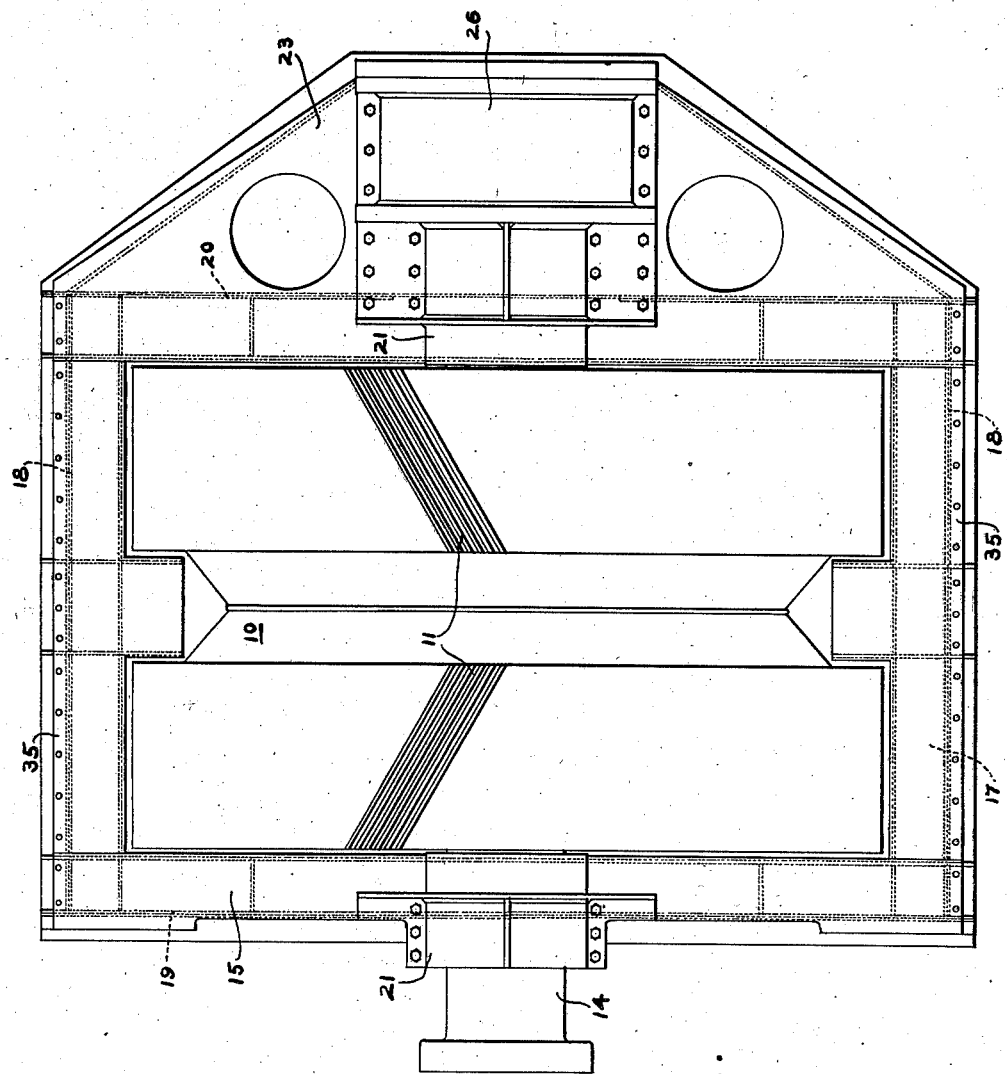
Fig. 2 is a plan view of the apparatus with the cover removed.
Figure 3:
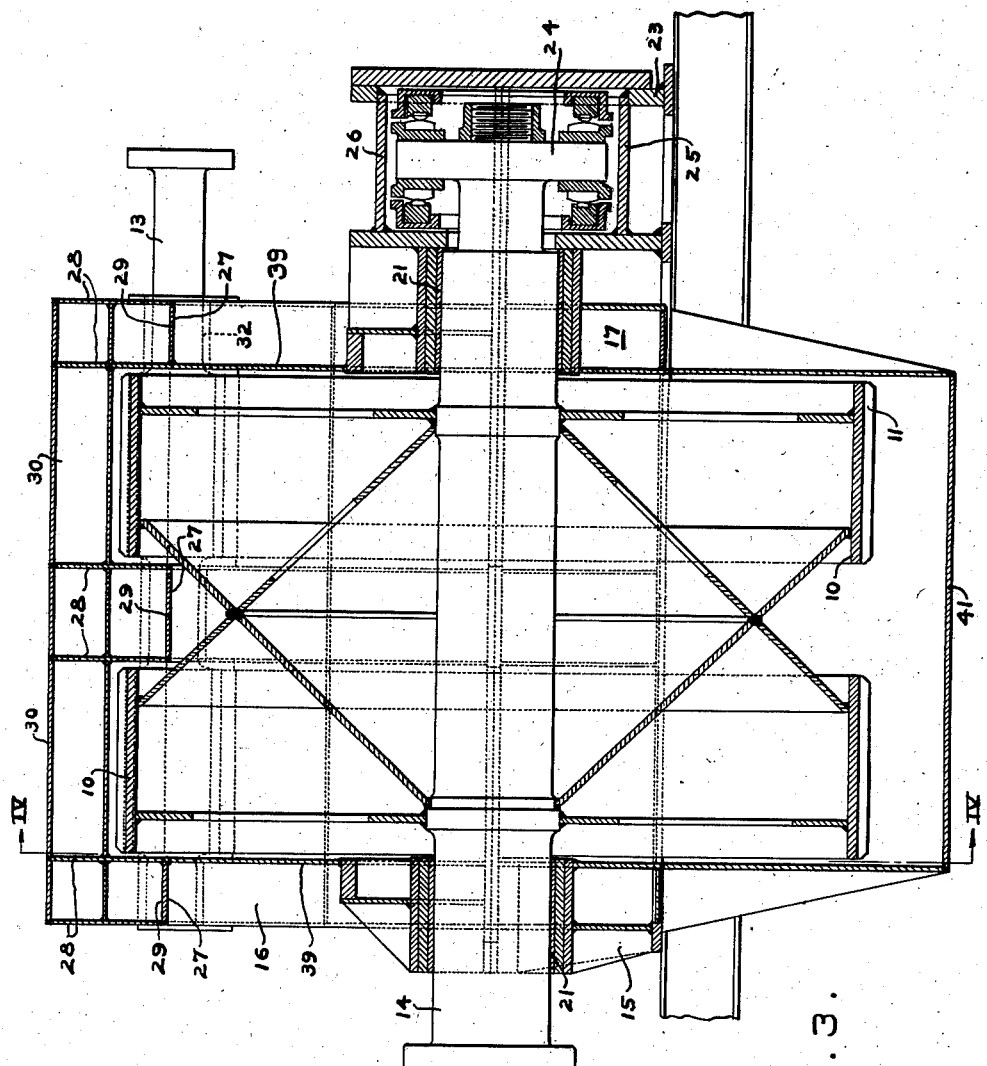
Fig. 3 is a longitudinal vertical section taken along the line III—III of Figs. 1 and 4.
Figure 4:
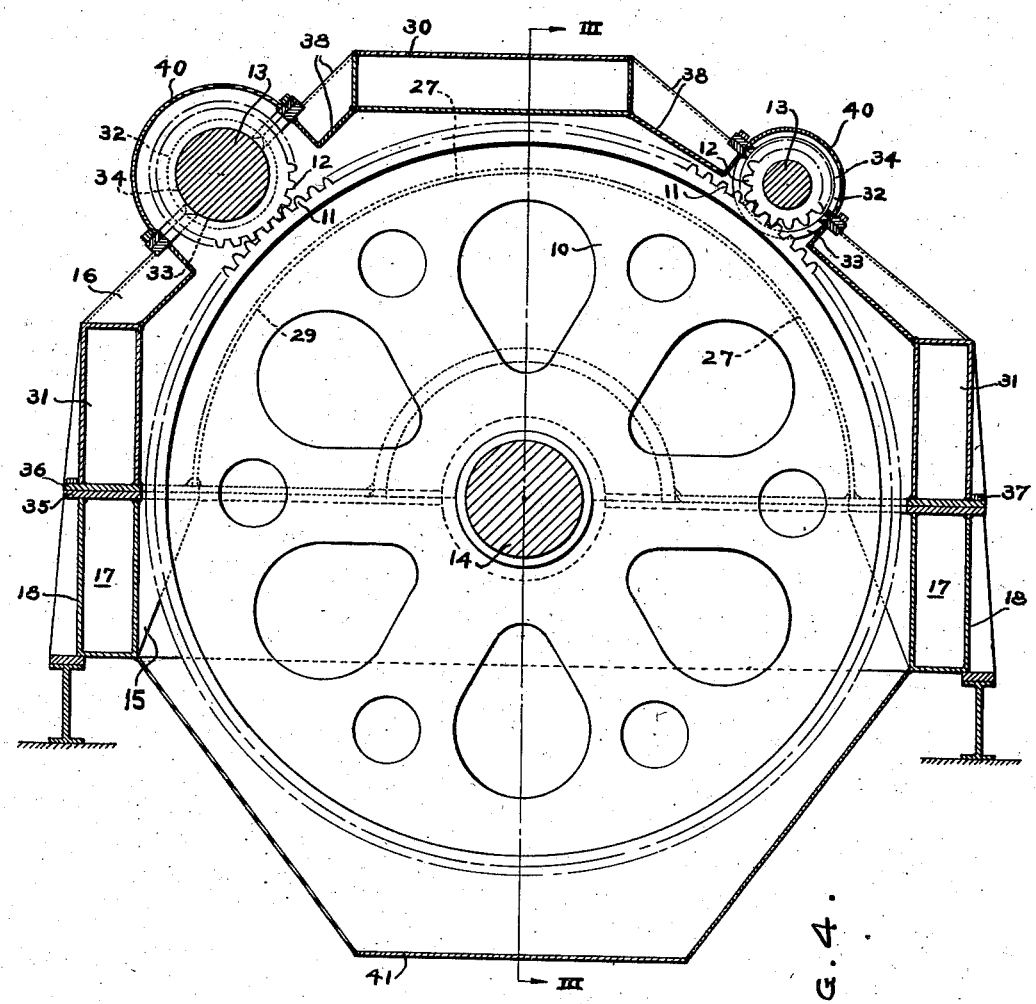
Fig. 4 is a transverse sectional view taken along the line IV—IV of Figs. 1 and 3.
Figure 5:
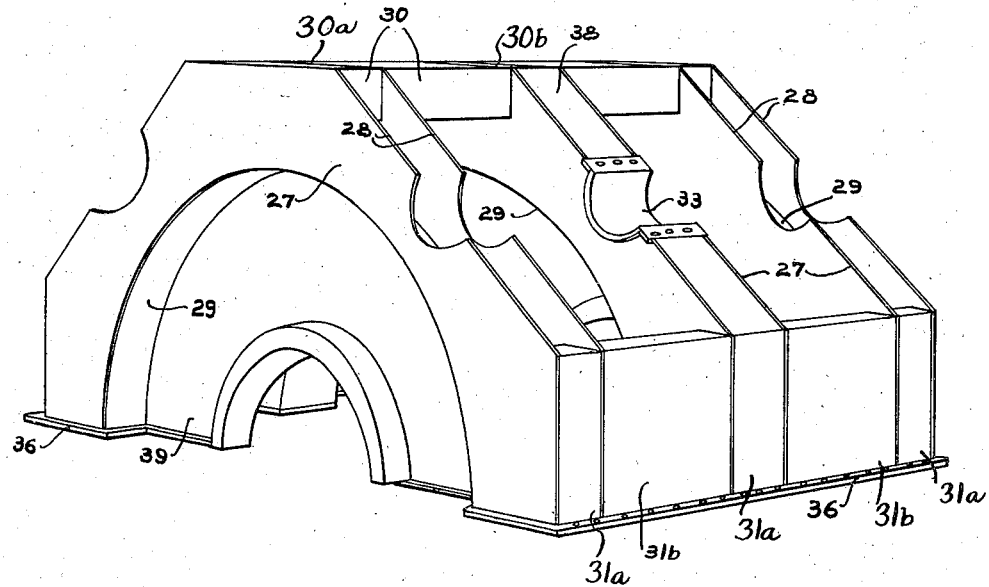
Fig. 5 is a perspective view of the stress elements of the cover structure.

In the drawings, I show a driven gear 10 preferably having opposed helically toothed portions 11, 11 meshing with opposed helically toothed portion 12, 12 of the driving pinion or pinions 13. The driven gear 10 is carried by a spindle 14 for connection to the usual propeller shaft and propeller (not shown) and the driving pinion or pinions are intended to be connected to any suitable source of power.

The gear members are supported and held in proper meshing relation by a casing including a lower part 15 and an upper, or cover, part 16.

The lower casing part 15 is preferably comprised by a rectangular structure 17 composed of side girders 18 connected by end girders 19 and 20, the girders preferably being of the box type. The end girders 19 and 20 are provided with radial bearings 21 for the gear spindle 14, and the end girder 20 also has associated therewith a structure 23 which supports the thrust bearing 24 for transmitting propeller thrust from the gear spindle to the side members 18, the latter being securely anchored to the ship's structure so as to virtually constitute a part thereof. In order that the structure 23 may serve effectively as a means of transmitting stress to side members 18 and thence to the ship's structure without causing distortion, it is desirable that such structure 23 shall be adequately wide horizontally toward the center. In other words, the member 23 may be regarded as a cross member attached at its ends to the ship's structure and having the propeller thrust imposed thereon at an intermediate point. It is, therefore, necessary that such member shall be constructed and arranged to afford adequate horizontal stiffness. The member 23 provides the lower housing part 25 for the thrust bearing, the upper housing part 26 for such bearing being detachably connected thereto.

The cover part 16 of the casing consists of a plurality of arches 27 preferably of the box girder type. In the drawings, I show each arch 27 consisting of side plates 28, 28 and an inner arcuate plate 29, these plates being cut from plate steel of suitable gauge and welded together. The ends of the arches are secured to the lower casing part and adjacent arches are connected at their ends by the box girder elements 31a and 31b and intermediately of their ends and between the pinions by box girder elements 30a and 30b. The first set of box girder elements 30a and 31a are arranged between and joined to the side plates of each arch and the second set of box girder elements 30b and 31b are arranged between and joined to opposed sides of adjacent arches. The first and second box girder elements 31a and 31b are alined at each side of the cover so as to provide a box girder structure for alinement with and super-position on the gear case box girders. The first and second box girders 30a and 30b arranged between the pinions are also alined so as to provide in effect a longitudinal box girder between the pinions and extending from end to end of the cover. The side box girder constructions embodying the ends of the arches as well as the intermediate box girder construction between the pinions serve both to provide light and strong arches as well as a unitary and composite arch and box girder construction which is light, strong and stiff and which, due to the nature and arrangement of the component structural elements is adequately resistant to any tendency to torsional deflection due to load transmitted by the gearing.

Where the gearing is of the double helical type, it is customary to have an intermediate supporting bearing between the helically toothed portions of each pinion. Accordingly, I show the cover part of the casing as including three arches 27 arranged at either end of the casing and midway of the length thereof. The arches are provided with bearings 32 for the journal portions of the pinions 13, the lower portions 33 of each bearing being unitary with the arches and the cap portions 34 of the bearings being detachably connected to the arches.

The lower and upper casing parts are provided with flanges 35 and 36, respectively, connected together by any suitable means, for example, by bolts 37.

The structure so far described is sufficient for supporting both the gear and the pinion members and for resisting all working stresses; however, it is necessary that a complete enclosure shall be provided for the gears in order that they may be protected and properly lubricated. To this end, open spaces between arches are filled by plate elements 38 welded thereto and the innermost plates 28 of the end arches extend inwardly, as shown at 39, and are connected to the radial bearings 21. The pinions are enclosed by detachable covers 40. The lower casing part has a pan structure 41 suspended from the rectangular frame 17. Thus, with these filler plate elements, connected to the skeleton stress construction of the gear housing, it is assured that the gearing will be enclosed.

From the foregoing, it will be apparent that I have provided a reduction gear suitable for the transmission of large powers wherein the driving pinion or pinions are supported by arch girders extending over the reduction gear and the girders are connected by suitable intervening structure so that the girders and the intervening structure constitute a torsionally stiff construction so as to avoid any tendency to displacement of the arches. Not only are the arches advantageous from the point of view of strength and weight but they also constitute desirable features where the gear casing is fabricated.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In reduction gearing, a gear; a pinion meshing with the gear; a casing comprising upper and lower parts; bearings carried by the lower part for the gear; bearings carried by the upper part for the pinion; said upper part including a plurality of arch girders disposed laterally of the toothed portions of the gear, extending over the gear, carrying the pinion bearings, and having its ends connected to the sides of the lower casing part; each arch girder including side plates with first box girder sections extending therebetween and joined thereto at their ends; and second box girder sections aligned with the first box girder sections and extending between and joined to side plates of adjacent arch girders.

2. In reduction gearing, a gear; a pinion meshing with the gear; a casing comprising upper and lower parts; bearings carried by the lower part for the gear; bearings carried by the upper part for the pinion or pinions; said lower part including side box girders constructed and arranged to support the reduction gearing; said upper part including a plurality of arch girders, disposed laterally of the toothed portions of the gear, extending over the gear, and carrying the pinion bearings; each arch girder including side plates, an arcuate plate extending between the side plates and having its side edges joined to the side plates, and first box girder sections extending between and joined to the side plates at the arch girder ends; and second box girder sections aligned with the first box girder sections and extending between and joined to side plates of adjacent arch girders; said second box girder sections being disposed a sufficient radial distance from the axis of the gear to clear the teeth thereof and cooperating with the first box girder sections to provide composite box girders which are arranged in superposed relation with respect to the side box girders of the lower casing part; and means for connecting the upper and the lower casing parts together.

3. In reduction gearing, a gear; a pair of pinions meshing with the gear; said pinions being spaced apart circumferentially of the gear and being arranged at opposite sides of the vertical axial plane of the latter; a casing comprising upper and lower parts; bearings carried by the lower part of the casing for the gear; bearings carried by the upper part of the casing for the pinions; said lower part of the casing embodying side box girders having means provided thereon for supporting the reduction gearing; said upper part including a plurality of arch girders disposed laterally of the toothed portions of the gear, extending over the gear, and carrying the pinion bearings; each arch girder including a pair of parallel side plates, an arcuate plate extending between the side plates and having its side edges joined to the latter, and first box girder sections extending between and joined to the side plates at the arch girder ends and between the pinions; second box girder sections aligned with the first box girder sections and extending between and joined to arcuate side plates of adjacent arch girders and spaced radially from the gear axis a sufficient distance to clear the gear teeth; the first box girder sections at the ends of the arch girders and the aligned second box girder sections constituting composite box girder structures which are superposed with respect to and rest on the side box girders of the lower casing part; and means for connecting the upper and the lower casing parts together.

4. In reduction gearing, a gear having spaced toothed portions; a pair of pinions having spaced toothed portions meshing with the toothed portions of the gear; said pinions being spaced apart circumferentially of the gear and being arranged at opposite sides of the vertical axial plane of the latter; a casing comprising upper and lower parts; bearings carried by the lower casing part for supporting the gear; aligned sets of bearings carried by the upper casing part for the pinion or pinions; each set of pinion bearings including end bearings arranged beyond the outermost ends of the pinion toothed portions and an intermediate bearing arranged between the latter; said lower casing part embodying side box girders having means thereon for supporting the reduction gearing; said upper casing part including a pair of end arch girders and an intermediate arch girder disposed laterally outside of and between the toothed portions of the gear and of the pinion or pinions, extending over the gear, and carrying the pinion bearings; each arch girder including a pair of parallel side plates, an arcuate plate extending between and having its side edges joined to the side plates, and first box girder sections extending between and joined to the side plates; said first box girder sections being arranged at the ends of the arch girders and between the pinions; second box girder sections aligned with the first box girder sections and extending between and joined to arcuate side plates of adjacent arch girders; the first box girder sections at the ends of the arch girders and the aligned second box girder sections constituting composite side box girders for the cover part and which are superposed on and are supported by the box girders of the lower casing part; and means for connecting the upper and the lower casing parts together.

IRA SHORT.